United States Patent [19]

Yamamoto

[11] Patent Number: 4,905,157
[45] Date of Patent: Feb. 27, 1990

[54] CONTROL METHOD FOR SHEARING BARS IN BAR STEEL LINE

[75] Inventor: Tomoko Yamamoto, Hyogo, Japan

[73] Assignee: Mitsubishi Denki Kabushiki Kaisha, Tokyo, Japan

[21] Appl. No.: 333,778

[22] Filed: Apr. 6, 1989

Related U.S. Application Data

[63] Continuation-in-part of Ser. No. 34,934, Apr. 6, 1987, abandoned.

[30] Foreign Application Priority Data

Apr. 7, 1986 [JP] Japan .................... 61-78324

[51] Int. Cl.[4] ............................. B21F 13/00
[52] U.S. Cl. ...................... 364/472; 83/63; 83/84; 83/241; 83/238; 364/474.09
[58] Field of Search ............ 364/472, 148, 474.09; 72/203; 83/370, 363, 238, 241, 409.1, 409.2, 417, 63, 83, 84, 85, 94

[56] References Cited

U.S. PATENT DOCUMENTS 4,526,073  7/1985  Elhaus ............... 83/363 X
4,724,696  2/1988  Sumino ............... 83/370 X

OTHER PUBLICATIONS

Tetsu To Hagane, Journal of Iron and Steel Institute, Mar. 12, 1981, "Enhancing The Shearing Yield of Bar Steel by Computer", vol. 67, No. 15, pp. 207–213.

Primary Examiner—Allen MacDonald
Attorney, Agent, or Firm—Bernard, Rothwell & Brown

[57] ABSTRACT

A control method for shearing bars in a bar steel line provided on the final end side of a bar steel production line so as to shear collectively and simultaneously to desired lengths a plurality of bars obtained by dividing a bar steel blank and arranged in parallel with each other, which comprises the steps of obtaining a minimum number of times for shearing the plurality of bars in a minimum time, shifting the order of different shearing lengths in each of the plurality of bars so as to minimize the time required for shearing on the basis of the minimum number of times shearing is performed, and shearing the plurality of bars simultaneously to the different equal-length bar steels in the minimum number of shearings and the minimum shearing required time.

3 Claims, 2 Drawing Sheets

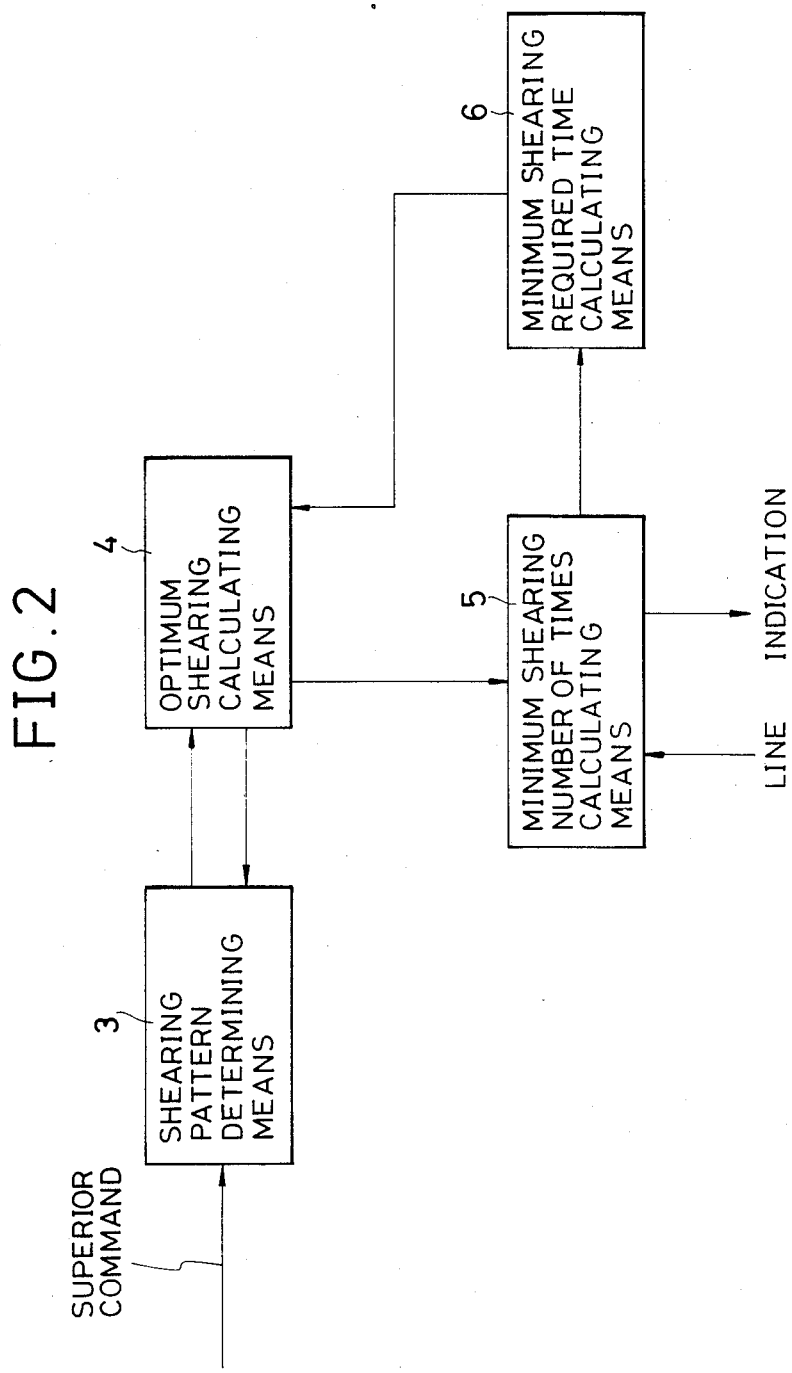

CONTROL METHOD FOR SHEARING BARS IN BAR STEEL LINE

This is a continuation-in-part of application Ser. No. 034,934, filed Apr. 6, 1987, now abandoned.

BACKGROUND OF THE INVENTION

1. Field of the Invention

The present invention relates to a control method for shearing bars in a bar steel production line, and more particularly to a control method for shearing bars by which bar steel products of the same order lengths can be obtained most efficiently in shearing simultaneously to predetermined order lengths a plurality of bars obtained by dividing a bar steel blank.

2. Description of the Prior Art

A bar steel blank, which is a steel formed into a bar shape by rolling or the like, is in general produced continuously by a bar steel production line. Unlike hoops, strips, wire rods and the like, the bar steel blank continuously produced with a fixed cross-sectional shape and a fixed diameter by rolling or the like is sheared to predetermined order lengths by the steps of once dividing the bar steel blank into a plurality of bars by a flying shear, arranging the bars in parallel with each other and again shearing the bars to the order lengths by a cold shear, the process being accompanied by loss of bars.

An optimal shearing control in a bar steel line has been disclosed, for example, in "Enhancing the Shearing Yield of Bar Steel by Computer", *Tetsu To Hagane* (Journal of the Iron and Steel Institute), Vol. 67, No. 15 (1981), pp. 207–213, particularly in the section "4.1 Modeling for DP" on page 208. The article deals with the problem of obtaining an optimum shearing number of times for each of a plurality of bars obtained by dividing a rolled bar steel blank in order to minimize the loss generated in arranging the bars in parallel with each other and simultaneously shearing the arranged bars to the same lengths desired for bar steel products, and proposes a control method which solves the problem as follows.

Where $g_i(x)$ = loss generated when the i-th divided bar is sheared x times, and $f_K(x)$ = minimum loss expected to be generated from K divided bars, the following functional equation is obtained according to the principle of optimization:

$$f_K(x) = \text{MIN}(g_K(x) + f_{K-1}(x))$$

$$0 \leq x \leq M_K$$

$$(K = 2, \ldots, N)$$

$$f_1(x) = g_1(x)$$

where

N = number of bars divided x = total number of times of parallel shearing $M_K$ = maximum number of times the divided bars can be sheared Accordingly, the article concludes that optimal shearing control can be carried out on the basis of the solution.

The conventional optimal shearing control method, as described above, concerns optimal shearing for enhancing the yield with a minimum bar loss, and lacks considerations of optimal shearing on the basis of the shearing number of times in shearing collectively a plurality of bars arranged in parallel with each other and optimal shearing on the basis of shearing time.

SUMMARY OF THE INVENTION

The object of the present invention is to provide a control method for shearing bars in a bar steel line which can enhance the yield of bars and minimize the shearing number of times and the time required for shearing.

In order to attain the above object, according to the prevent invention, there is provided a control method for shearing bars in a bar steel line wherein in simultaneously shearing a plurality of bars, the order of shearing lengths scheduled for each bar is shifted so as to enhance the efficiency in simultaneous shearing of the plurality of bars.

BRIEF DESCRIPTION OF THE DRAWINGS

FIG. 2 is a block diagram showing a device for carrying out the control method for shearing bars according to the present invention.

DETAILED DESCRIPTION OF THE PREFERRED EMBODIMENTS

Figure 1:
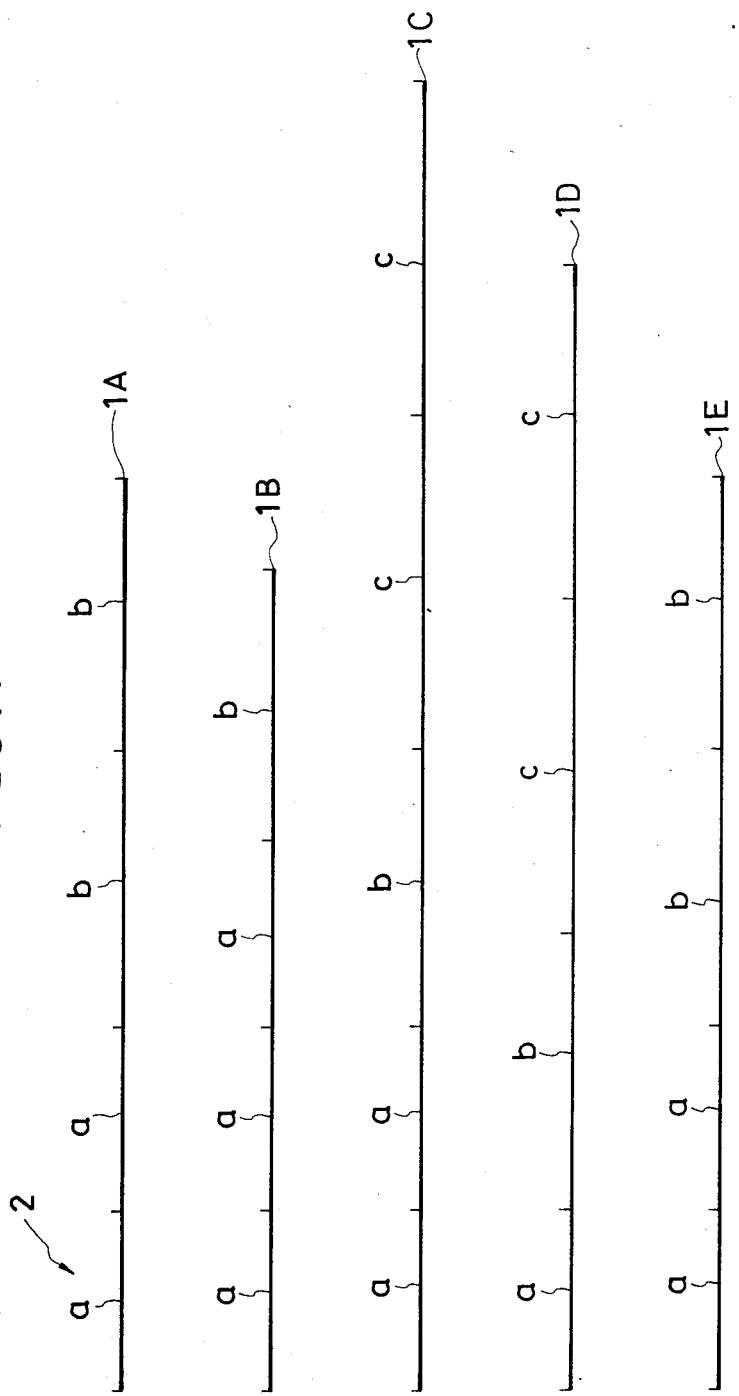
FIG. 1 illustrates a pattern for bars to be sheared in an embodiment of the control method for shearing bars according to the present invention.

Preferred embodiments of the control method for shearing bars according to the present invention will now be described in detail below while referring to the drawings.

FIG. 1 shows a pattern for the bars to be sheared by a cold shear, wherein 1A to 1E denote the bars, and numeral 2 denotes a portion of the shearing lengths in a bar.

Even with a certain pattern set, the shearing number of times and the shearing time required for shearing all the bars according to the pattern vary depending on the order of shearings. Therefore, enhancing the efficiency requires the consideration of a pattern and an order of shearings for minimizing the time required for shearing.

Minimizing the shearing time requires minimization of the number of shearing operations required. The numbers of bar steels on a shearing length basis in each bar are obtained from FIG. 1 as follows: the first bar 1A contains two a-m bar steels and two b-m bar steels; the second bar 1B contains three a-m bar steels and one b-m bar steel, and so on.

The minimum shearing number of times for the pattern can be obtained by minimizing the total number of shearings for the same shearing lengths in the pattern.

Accordingly, the sum of the maximum numbers of the same lengths in individual bars is the minimum shearing number of times, Nmin. In the case of the pattern shown in FIG. 1, $$\begin{aligned}
N\text{min} &= \text{maximum number of } a\text{-}m \text{ bar steels} + \text{maximum} \\
&\quad \text{number of } b\text{-}m \text{ bar steels} + \text{maximum number} \\
&\quad \text{of } c\text{-}m \text{ bar steels} \\
&= 3 + 2 + 2 \\
&= 7 \text{ (times)}
\end{aligned}$$

In a general form, $$N\text{min} = \sum_{i}^{n} \max(m_{ij}) \ (j = 1, \ldots, l)$$

n : number of kinds of lengths in the pattern
l : number of bars in the pattern
$m_{ij}$: number of bar steels with a length to be sheared from a bar In actual shearing with the shearing number of times minimized as described above, it is preferable to concentratedly perform shearing for the same shearing length. However, shearing a plurality of bars collectively by a cold shear involves stand-by conditions for each bar, that is, each bar must wait for shearing for the relevant shearing length. The time required for shearing varies depending on the stand-by conditions.

Once the minimum number of shearing operations Nmin has been calculated as set forth above, the number of possible orders of performing these operations is Nmin factorial, namely, [(Nmin)×(Nmin−1)×(Nmin−2)×...×1], which can be designated in mathematical terms a Nmin!.

Each one of the Nmin! possible orders has associated therewith a fixed and known total standby time which is dependent upon the particular manufacturing facility under consideration and is a known quantity. Minimizing the total standby time involves the selection of one order among the Nmin possible orders which has a minimum total standby time.

For a calculated minimum number of shearing operations Nmin, the number of orders is thus $S_i$(i=1, 2, ..., Nmin!). Each $S_i$ has a fixed total standby time $\Delta t_i$ associated therewith such that the specific selected order $S_k$(1≦K≦Nmin!) has a total standby time $\Delta t_k < \Delta t_i$, i≠K.

Accordingly, a process minimizing the stand-by time gives the optimal pattern in view of the shearing number of times and the shearing time. The process for minimizing the stand-by time can be determined by setting a suitable combination of the orders of the kinds of shearing lengths in the pattern.

FIG. 2 shows a block diagram of a device for carrying out the control method for optimum shearing according to the present invention, in which numeral 3 denotes a shearing pattern determining means, numeral 4 an optimum shearing calculating means, numeral 5 a minimum shearing number of times calculating means and numeral 6 a minimum shearing required time calculating means, all of the means being provided in a microcomputer (not shown).

In response to a superior command and in consideration of a prescheduled pattern and actual length errors, the shearing pattern determining means 3 allocates shearing lengths to each of the bars.

Next, a minimum shearing number of times is obtained by the minimum shearing number of times calculating means 5 on the basis of the thus determined pattern, then a combination of the orders of the kinds of shearing lengths in the pattern is calculated by the minimum shearing required time calculating means 6 on the basis of the minimum shearing number of times, and a pattern for optimum shearing is determined by the optimum shearing calculating means 4, whereby the time-basis efficiency in the cold shear line can be considerably enhanced.

As stated above, according to the present invention, a minimum shearing number of times for a shearing pattern in a cold shear line is determined, and the order of the kinds of shearing lengths in the shearing pattern is shifted so as to minimize the stand-by time on the basis of the minimum shearing number of times, whereby the time required for shearing can be shortened, and the bars can be efficiently sheared to desired lengths to obtain desired numbers of steel bar products.

What is claimed is:

1. A control method for shearing bars in a bar steel line provided on the final end side of a bar steel production line so as to shear collectively and simultaneously to desired lengths a plurality of bars obtained by dividing a bar steel blank and arranged in parallel with each other, which comprises:
   obtaining a minimum shearing number of times for shearing said plurality of bars in a minimum time,
   selecting the order of several different shearing lengths in each of said plurality of bars so as to minimize the time required for completion of shearing on the basis of said minimum shearing number of times, and
   shearing said plurality of bars simultaneously to each different shearing length in said minimum shearing number of times and in the minimum time required for completion of shearing.

2. A control method according to claim 1, wherein allocation of shearing lengths to each bar is made by determining a shearing pattern in consideration of a preset pattern and actual length errors, and calculating said minimum shearing number of times by the minimum shearing number of times on the basis of said shearing pattern.

3. A control method according to claim 1, wherein the steps of obtaining a minimum shearing number of times and selecting the order of said different shearing lengths comprise calculating a combination of said different shearing lengths for shearing said plurality of bars simultaneously in a minimum time by minimum-shearing required time calculating means on the basis of said minimum shearing number of times, and determining a pattern for optimum shearing by optimum shearing calculating means.

* * * * *

UNITED STATES PATENT AND TRADEMARK OFFICE
CERTIFICATE OF CORRECTION

PATENT NO. : 4,905,157

DATED : February 27, 1990

INVENTOR(S) : Tomoko Yamamoto

It is certified that error appears in the above-identified patent and that said Letters Patent is hereby corrected as shown below:

Column 2, line 13, "prevent" should be --present--.

Signed and Sealed this

Tenth Day of September, 1991

Attest:

HARRY F. MANBECK, JR.

*Attesting Officer*  *Commissioner of Patents and Trademarks*